United States Patent
Eichstadt et al.

(10) Patent No.: US 11,035,294 B2
(45) Date of Patent: Jun. 15, 2021

(54) TURBOMACHINE WITH DOUBLE FLOW AND ITS LUBRICANT RESERVOIR

(71) Applicant: SAFRAN AIRCRAFT ENGINES, Paris (FR)

(72) Inventors: Frédéric Paul Eichstadt, Fontainebleau (FR); Nicolas Maurice Hervé Aussedat, Melun (FR); Bellal Waissi, Vert Saint Denis (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 139 days.

(21) Appl. No.: 16/156,770

(22) Filed: Oct. 10, 2018

(65) Prior Publication Data
US 2019/0112982 A1      Apr. 18, 2019

(30) Foreign Application Priority Data
Oct. 12, 2017   (FR) ...................................... 1759578

(51) Int. Cl.
*B64D 33/00* (2006.01)
*F02C 7/32* (2006.01)
(Continued)

(52) U.S. Cl.
CPC .............. *F02C 7/06* (2013.01); *F01M 11/12* (2013.01); *F02C 7/32* (2013.01); *F02C 9/18* (2013.01);
(Continued)

(58) Field of Classification Search
None
See application file for complete search history.

(56) References Cited

U.S. PATENT DOCUMENTS

| 5,610,341 A * | 3/1997 | Tortora | .................... F01D 17/02 |
| | | | 73/756 |
| 2010/0005777 A1* | 1/2010 | Marshall | .................... F02K 1/42 |
| | | | 60/204 |

(Continued)

OTHER PUBLICATIONS

French Preliminary Search Report and Written Opinion dated Jun. 1, 2018, for French Application No. 1759578, filed Oct. 12, 2017, 7 pages.

*Primary Examiner* — Steven M Sutherland
*Assistant Examiner* — Rodolphe Andre Chabreyrie
(74) *Attorney, Agent, or Firm* — Christensen O'Connor Johnson Kindness PLLC

(57) ABSTRACT

Bypass turbine engine, comprising a gas generator surrounded by a nacelle and connected to the latter by tubular arms, a primary flow duct within the gas generator being externally delimited by a first annular casing of the gas generator, and a bypass flow duct of a secondary flow around the gas generator being internally delimited by a second annular casing of the gas generator and externally by a third annular casing of the nacelle, the second and third casings being connected together by at least some of the tubular arms, characterized in that it comprises at least one lubricant tank located in the annular space that extends between the first and second casings, and lubricant supply means of the tank or of each tank that comprise at least one supply line extending from the or each tank to at least one filler opening located at the level of the third casing, passing within at least one of said arms connecting the second and third casings.

9 Claims, 4 Drawing Sheets

(51) Int. Cl.
*F01D 25/00* (2006.01)
*F02C 7/06* (2006.01)
*F01M 11/12* (2006.01)
*F02C 9/18* (2006.01)
*F02K 1/72* (2006.01)
*F02K 3/04* (2006.01)
*B64D 27/10* (2006.01)

(52) U.S. Cl.
CPC ............... *F02K 1/72* (2013.01); *F02K 3/04* (2013.01); *B64D 27/10* (2013.01); *B64D 33/00* (2013.01); *F05D 2220/323* (2013.01); *F05D 2260/80* (2013.01); *F05D 2260/98* (2013.01)

(56) References Cited

U.S. PATENT DOCUMENTS

| | | | | |
|---|---|---|---|---|
| 2013/0291514 | A1* | 11/2013 | Suciu | F02C 7/14 60/39.08 |
| 2014/0010639 | A1 | 1/2014 | Snape et al. | |
| 2015/0075132 | A1* | 3/2015 | Kohn | B64D 47/00 60/39.08 |
| 2016/0305166 | A1* | 10/2016 | Georgi | E05B 81/18 |
| 2017/0211412 | A1 | 7/2017 | Raimarckers et al. | |

* cited by examiner

TURBOMACHINE WITH DOUBLE FLOW AND ITS LUBRICANT RESERVOIR

TECHNICAL FIELD

The present invention relates to a bypass turbine engine equipped with at least one lubricant tank.

STATE OF THE ART

Conventionally, a bypass turbine engine comprises a gas generator surrounded by a nacelle. A fan is located upstream from the gas generator and generates a flow of gas that is separated into a primary flow that flows within the gas generator (through the compression stages, a combustion chamber and the turbine stages), and a bypass flow that flows between the gas generator and the nacelle.

A turbine engine is equipped with at least one lubricant tank for the supply of lubricant, and in particular of oil, especially of turbine engine bearings.

The lubricant tank is generally installed in the nacelle compartment, i.e. inside the nacelle. The nacelle comprises a casing that surrounds the gas generator and externally defines the bypass flow duct of a secondary flow, and an outer annular cowling that extends around and at a distance from said casing. The annular space between the cowling and the casing is called the nacelle compartment and enables to store several items of equipment of the turbine engine, such as the aforementioned tank, which is relatively voluminous. The positioning of the tank within that space facilitates access to the tank, as it is sufficient to provide a direct access hatch on the cowling or to disassemble a part of the cowling to have access to the tank, for example in view of a maintenance operation, such as filling the tank.

In future architectures, the search for a reduction in fuel consumption of the engines pushes toward an increase of the dilution ratio of the engines. This is the case with the prototype of an engine called UHBR (which stands for Ultra High By-pass Ratio), whose fan diameter is significantly increased with respect to a conventional engine. The increase of the fan diameter leads to an increase of the nacelle dimensions, and therefore aerodynamic losses are induced (increased front surface and wetted surface). Refining the lines of the nacelle is therefore particularly important for this type of engine architecture. Lowering the height between the nacelle and the casing of the nacelle compartment requires moving voluminous equipment items from the nacelle compartment to other locations within the turbine engine.

Studies have shown that it is highly advantageous to place the lubricant tank in the engine compartment of the gas generator, as shown for example in documents US 2014/0010639 and US 2013/0291514.

The problem relating to the environment of this installation within the engine compartment resides in that the lubricant tank must be filled from the outside, "under the wing", by a maintenance technician.

In the case of a "conventional" tank, i.e. a tank equipped with a filler opening located on the actual tank, the filling operation would be impossible, as the tank, located inside the engine compartment, would be inaccessible. Indeed, because of its position inside the propulsion unit, the tank and its filler opening would be located inside several coaxial layers, such as a fan cowl, the cascade thrust reverser (which is potentially fixed in UHBR architectures), an outer shroud of the intermediate casing, and the cowling of the kit engine, which is the most central part of the system's environment.

As the filling operation must be carried out in a very short time, and as opening of the fan cowls and the thrust reversers is not usually part of this operation, the access to the filler opening in such a case would not be possible. The number of "layers" and the large diameter of a UHBR would make it difficult, and even impossible, to reach the tank from the outside.

Furthermore, the filling operation would be blind-conducted, which is inconceivable. It is therefore necessary to provide a solution enabling to fill the tank located inside the propulsion unit, without opening the cowls that constitute the nacelle.

The present invention proposes a simple, efficient and economical solution to this problem.

Presentation of the Invention

For this purpose, the invention proposes a bypass turbine engine, comprising a gas generator surrounded by a nacelle and connected to the latter by tubular arms, a primary flow duct within the gas generator being externally delimited by a first annular casing of the gas generator, and a bypass flow duct of a secondary flow around the gas generator being internally delimited by a second annular casing of the gas generator and externally by a third annular casing of the nacelle, the second and third casings being connected together by at least some of the tubular arms, the turbine engine comprising at least one lubricant tank located in the annular space that extends between the first and second casings, and lubricant supply means of the tank or of each tank that comprise at least one supply line extending from the or each tank to at least one filler opening located in the vicinity of the third casing, passing inside at least one of said arms connecting the second and third casings. The turbine engine according to the invention is characterized in that the supply means comprise means to visualize the oil level in the tank.

The invention thus makes it possible to fill a lubricant tank located in the engine compartment, as if it were located in the nacelle compartment, which is particularly advantageous. This is made possible via the filler opening located at the level of a casing of the nacelle and which can be accessible via a simple access hatch on the cowling of the nacelle. In this case, it is not necessary to disassemble the cowls of the nacelle to fill the tank and to visualize the filling level, which allows a gain of time for this frequent operation and thus a reduced immobilization time of the aircraft equipped with the turbine engine.

The turbine engine according to the invention can comprise one or several of the following characteristics or steps, taken individually or in combination:

- the or each tank has a generally curved shape and extends partially about a longitudinal axis of the turbine engine,
- the or each tank is located substantially perpendicular to a low pressure compressor of the gas generator,
- the nacelle comprises an outer annular cowling comprising at least one hatch providing access to said filler opening,
- the supply means are configured so that lubricant that is poured in the or each filler opening flows by gravity only to the or each tank,
- the visualization means comprise at least one float,
- the supply means comprise a vent pipe of the tank, extending from the or each tank up to the vicinity of the filler opening, passing in at least one of said arms connecting the second and third casings, the or each line comprises a first substantially straight section that extends substantially radially with respect to a longitudinal axis of the turbine engine, inside the tubular arm, and a second substantially straight section that extends substantially parallel to the aforementioned axis, in the downstream direction, inside said space, said at least one filler opening is located upstream from a cascade thrust reverser of the turbine engine, said at least one filler opening is located in a filling chamber of which at least some of the walls are secured to an outer annular cowling of the nacelle.

DESCRIPTION OF THE FIGURES

The invention will be better understood, and other details, characteristics and advantages of this invention will become clearer upon reading the following description, provided as an example and not limited thereto, and with reference to the appended drawings, in which.

DETAILED DESCRIPTION

Figure 1:
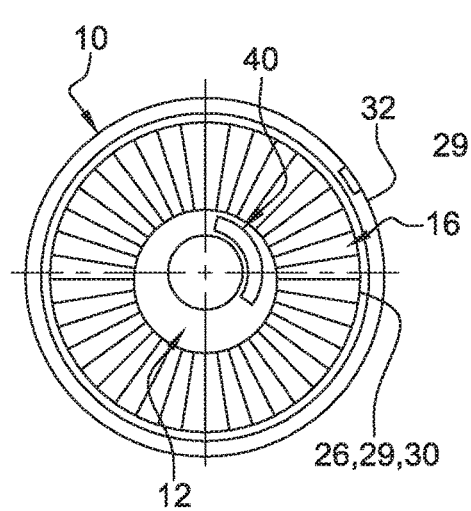
FIG. 1 is a highly schematic view of a side of the turbine engine according to the invention.
Figure 2:
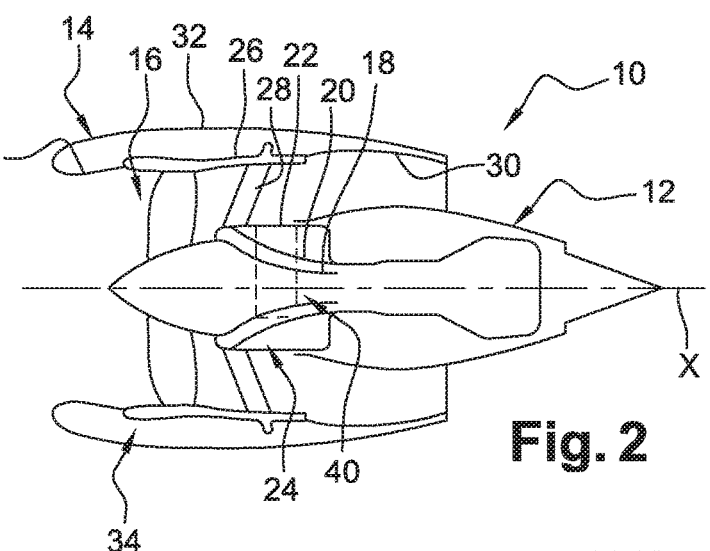
FIG. 2 is a highly schematic axial cross-section view of a turbine engine according to the invention.
Figure 3:
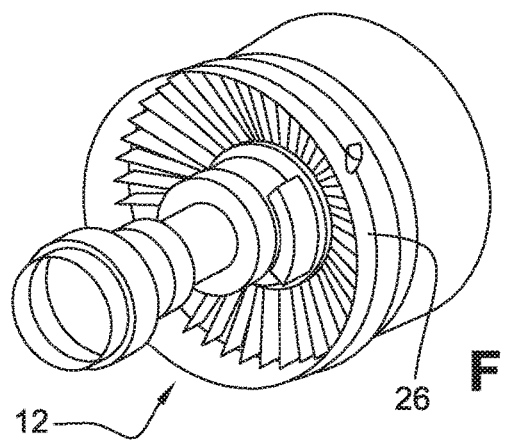
FIG. 3 is a schematic perspective view of a propulsion unit of the turbine engine according to the invention.
Figure 4:
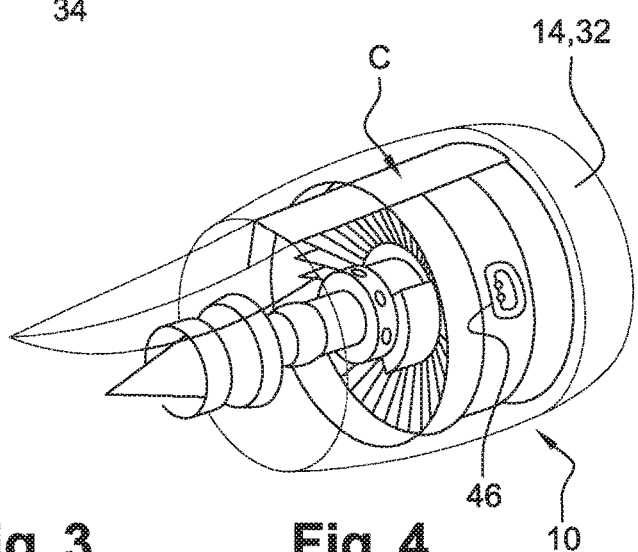
FIG. 4 is a partial schematic axial cross-section view of a turbine engine according to the invention, and shows a lubricant tank and the means to supply this tank.

FIGS. 1 and 2 schematically show an aircraft bypass turbine engine 10. This turbine engine 10 essentially comprises two parts, which are a gas generator 12 that has a generally elongated shape along a longitudinal axis X of the turbine engine, and a nacelle 14 that surrounds the gas generator 12.

The gas generator 12 is not shown in detail. Conventionally, it comprises two rotating bodies, which are a low pressure (LP) body and a high pressure (HP) body. Each body comprises a compressor rotor and a turbine rotor. The gas generator comprises, from upstream to downstream, in the direction of the gas flow, an LP compressor, an HP compressor, a combustion chamber, an HP turbine and an LP turbine. The rotors of the HP compressor and of the HP turbine are connected together by an HP shaft forming the HP body, the rotors of the HP compressor and of the HP turbine being respectively located upstream and downstream from the combustion chamber. The rotors of the LP compressor and of the LP turbine are connected together by an LP shaft forming the LP body, the rotors of the LP compressor and of the LP turbine being respectively located upstream from the HP compressor and downstream from the HP turbine. The LP shaft drives, among others, either directly or by means of a reduction gear, a fan rotor 16, which is located upstream from the gas generator.

The gas generator 12 comprises a primary flow duct or a hot flow duct that passes through the compressors, the combustion chamber and the turbines. This flow duct is generally externally and internally delimited by annular casings 18, 20 between which extend, in particular, the blades of the compressors and of the turbines. The annular casing 20 that externally delimits this flow duct is surrounded, at a distance, by an annular casing 22. The casings 20 and 22 are radially distant from one another and define between them an annular space called engine compartment 24. The casings 20, 22 can form, at the level of the LP and HP compressors, a unit conventionally called intermediate casing hub.

The gas generator 12 is surrounded by an annular casing 26 of a fan, which extends around the fan rotor 16 and is rigidly connected to the gas generator, at the level of the casing 22, by an annular row of substantially radial tubular arms 28. These arms can be of the kind that is usually called OGV grid (OGV standing for Outlet Guide Vane).

The unit comprising the gas generator 12, the fan rotor 16, the casing 26 and the arms 28 form a propulsion unit. The casing 26 is integrated in the nacelle that comprises the annular casings 29, 30 extending, in the upstream to downstream direction, from the casing 26, in the extension of the latter, as well as an outer annular cowling 32 that extends around the casings 26, 29, 30. The cowling 32 extends at a radial distance from casings 26, 29, 30 and with them delimits an annular space called nacelle compartment 34.

In the current state of the art, a lubricant tank, and in particular of oil, for example to lubricate the bearings of the turbine engine 10, is mounted in the nacelle compartment 34. The tank is therefore accessible inside the nacelle compartment, by removing a panel of the cowling 32 for example, for the purpose of filling the tank and determining its oil level.

The invention proposes to position the lubricant tank 40 in the engine compartment 24, as schematically represented in FIGS. 1 and 2. In the represented example, it is located between casings 20, 22, substantially perpendicular to a compressor, for example an LP compressor, and/or perpendicular to the arms 28. In the particular embodiment example represented (see FIG. 2) it is located on a transversal plane substantially intersecting the radially outer ends of the arms 28 that extend radially outwards in the upstream to downstream direction. The tank 40 has here a generally curved shape (see FIG. 1) that globally fits with the shape of the engine compartment 24 available on that plane.

FIGS. 3 to 5a show a more concrete embodiment example of the invention. The tank 40 is housed in the engine compartment 24 and is connected to means to supply lubricant to the tank, which include at least one supply line 42 that extends from the tank to at least one filler opening 44 located at the level of the casing 26 (see FIG. 3). The line 42 passes through one of the arms 28 (see FIG. 5a). The cowling 32 of the nacelle 14 can comprise a removable panel providing access to the tank 40 or, preferably, a hatch 46 providing access to the tank (see FIG. 4). This hatch 46 is for example hinged-mounted on a cowling panel, and is moveable from a closed position of the access opening 44 to a free-access position of this opening. The hatch 46 and the opening 44 are preferably located upstream from a cascade thrust reverser of the turbine engine.

Figure 5A:
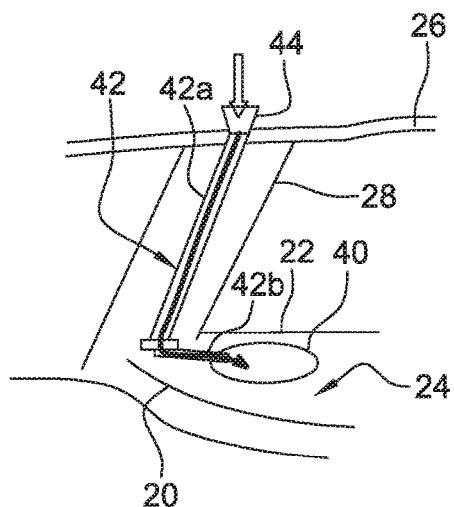
FIGS. 5a and 5b are schematic perspective views of two variant embodiments of a turbine engine according to the invention.
Figure 5B:
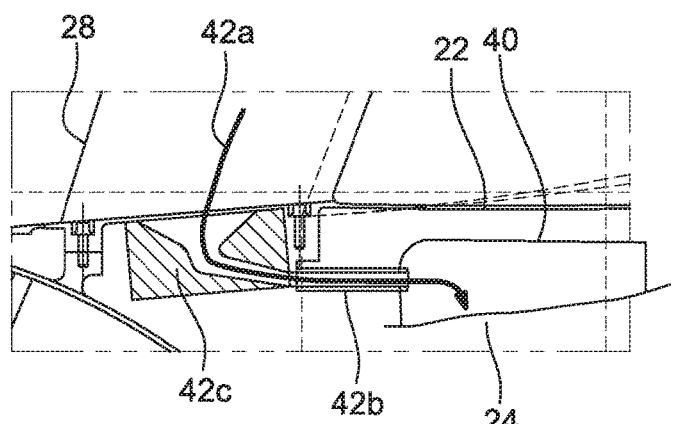

FIGS. 5a and 5b show embodiment examples of the line 42.

In the embodiment example of FIG. 5a, the line 42 comprises two parts, a first straight and substantially radial part 42a that extends inside the arm 28 from its radially outer end connected to the filler opening 44 to its radially inner end connected to an upstream end of a second straight and substantially axial part 42b that extends inside the compartment 24, the downstream end of which is connected to the tank 40. The first part 42a extends substantially parallel to the axis of elongation of the arm 28 and is here substantially inclined with respect to a transversal plane. Its radially outer end is located downstream from its upstream end. In other words, it extends radially outwards in the upstream to downstream direction, similarly to the arm 28. The part 42a is preferably rigid and the part 42b is preferably flexible.

In the variant embodiment shown in FIG. 5b, the line 42 comprises three parts, a first straight part 42b similar to that shown in FIG. 5a and of which a radially inner end opens into a boss cavity 42c radially located inside the casing 22 or the aforementioned hub. This cavity is connected by a flexible part 42c, similar to that shown in FIG. 5a, to the tank 40.

To enable the proper filling of the tank 40 it is preferable to implement a dedicated solution that complies with the following constraints:
to enable filling the tank without use of an additional system, therefore using simple oil cans (enabling filling of the tank in any airport by gravity),
to enable visualization of the oil level in order to complete the oil in the tank.

Figure 6:
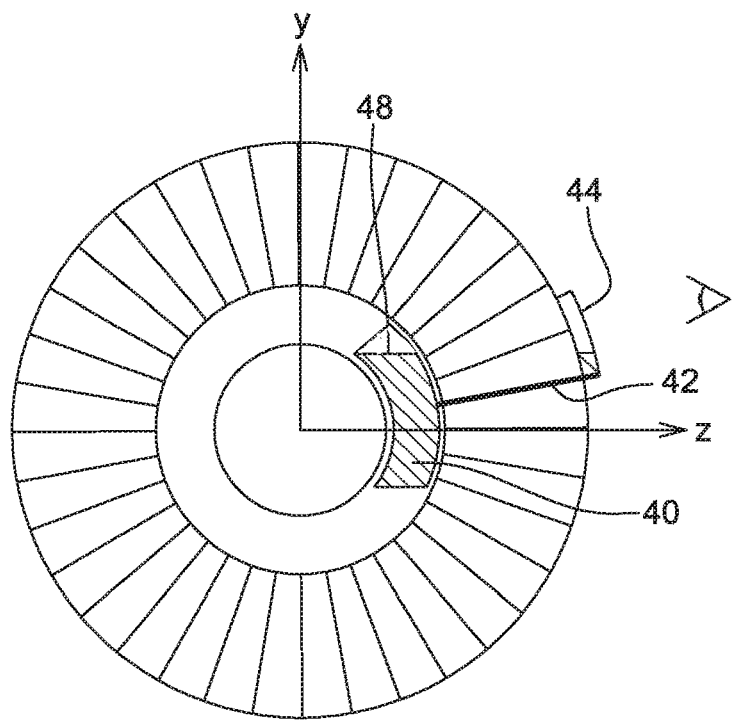
FIG. 6 is a view corresponding to that of FIG. 1 schematically showing the supply means of a lubricant tank.

The filler opening 44 is preferably located in the upper part of the turbine engine 10 (see FIG. 6). By analogy with the dial of a clock, the opening 44 is preferably located at 2 o'clock approximately, the zone at 12 o'clock (designated by the letter C in FIG. 4) being reserved for the pylon securing the turbine engine to a wing of the aircraft. This enables a maintenance technician to access the hatch 46 and the filler opening 44 "under the wing" of the aircraft. The line 42 extends from its uppermost point, radially located outside and connected to the filler opening 44, to its lowermost point radially located inside and connected to the tank 40. The oil poured into the opening 44 can therefore flow by gravity into the tank 40.

To visualize the level of oil 48 in the tank 40 (during filling operations as well), it is preferable not to have a siphon inside the line 42. It is therefore preferable that the line passes through an arm 28, the maximum z dimension of which does not exceed the oil filling level (see FIG. 6).

To make it possible to visualize the oil level 48 during filling operations, it is proposed to implement means to visualize the fill level based on the installation of the tank 40.

Figure 8:
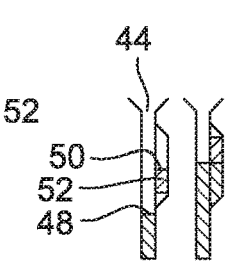

The visualization means are located, as shown in FIG. 8, in the cowling 32 at the level of the hatch 46.

Figure 7:
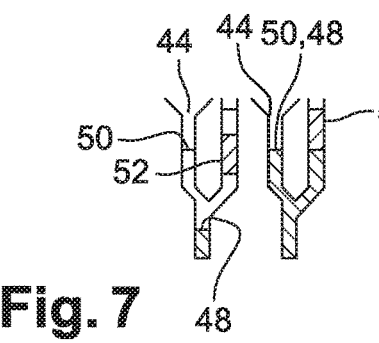
FIGS. 7 to 9 are highly schematic views of supply means and means to visualize the oil level in a tank.

If the maximum oil level 50 is low with respect to the filling hatch 46, the integration of a float 52 to visualize the level 48 allows the operator to be visually informed of the oil level. FIG. 7 comprises an example of such an embodiment, the image on the left representing the float 52 in a low position owing to the fact that the oil level 48 in the tank is lower than the allowed maximum oil level 50, and the image on the right representing the float 52 in a top position owing to the fact of the oil level 48 in the tank is at the maximum level 50.

Depending on the configuration of the engine, different visualization variants with a float are possible (see FIG. 8).

Figure 9:
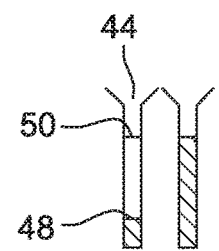

If the maximum oil level 50 is up to where it can be seen by the operator, it will not be necessary to implement means to elevate the oil level (see FIG. 9).

In order to simplify maintenance operations to a maximum, it is possible to design a filling interface with a large filler and pouring opening (large funnel—see FIG. 11 with reference 44a), fixed to the casing 26 or to the nacelle. It is also possible to associate to it an anti-spill edge 32a (see FIG. 11). This interface can be in the form of a filling chamber A accessible through the hatch 46 in which is especially visible the filler opening 44. At least some of the walls of the chamber A, in particular the wall comprising the filler opening 44, can be secured to the cowling 32 of the nacelle 14.

Means to secure the filler opening 44 to the casing 26, which is technically simpler, requires the operator to be more attentive during filling operations. Indeed, he should be careful not to contaminate the nacelle compartment (which is a non-fire area on UHBR) by spilling oil around the opening 44. Depending on the height and dimensions of the hatch 46, the depth of the nacelle compartment and the filling conditions (night time, on a platform, in cold weather, etc.), this operation can be more or less complex. This solution is nevertheless entirely feasible (and is similar to a conventional solution for the filling of a tank).

Fixing the aforementioned interface to the nacelle 14 enables avoiding the risk of contaminating the compartment, and brings the filler opening 44 closer to the operator. It can require the addition of a flexible pipe containing the relative movements between the outer cowling 32 of the nacelle and the casing 26. A positioning on the nacelle is interesting for the UHBR configuration, as the engine features very few equipment items in the nacelle compartment (goal of thinner nacelle), the cowls of the nacelle are likely to be fixed. The presence of fixed cowls avoids the installation of overlength flexible pipe allowing for movement, or the addition of complex disconnection systems in case of significant movements.

However, it is preferable to provide a disconnection means for the removal operations of the nacelle. The mounting on the nacelle can, depending on the size of the interface, according to its axial position and the height of the compartment and of the cascade thrust reverser, make it possible to integrate the interface directly perpendicular to the arm 28.

When the tank 40 is being filled, the air contained in the tank should be able to escape in order to make room for the oil poured by the maintenance operator.

Usually, a deaerator of the tank allows air to escape towards the de-oiler, the latter being vented. The pressure balance (the internal pressure of the tank relative to the atmospheric pressure) required to fill by gravity is thus ensured.

In case the oil tank comprises a pressurization valve, air exhaust would not be possible via the deaerator. It would then be necessary to add a venting device. This device can include a cap in addition to the cap 54 used to close the opening 44. Caps must be removed prior to filling (and closed the rest of the time to prevent a negative g from emptying the tank into the venting compartment). The caps are preferably connected by a chain 54a or the like to a wall of the chamber A, so that they cannot be lost (see FIG. 11).

Figure 10:
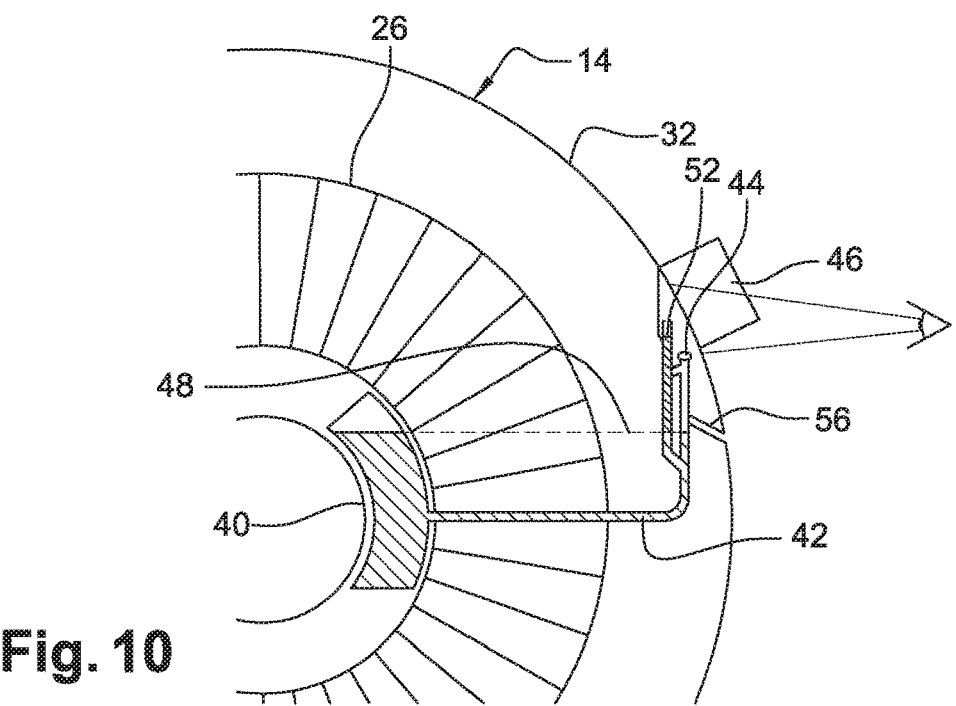
FIG. 10 is a large-scale view similar to that of FIG. 6 and providing a detailed view of the supply means.
Figure 11:
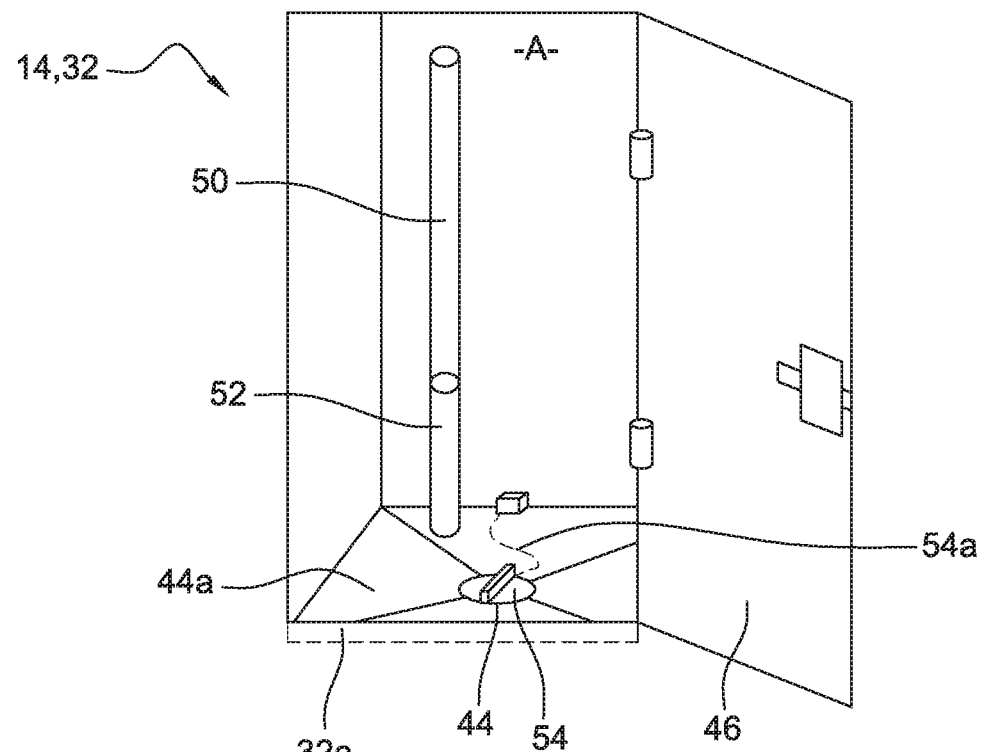
FIG. 11 is a schematic perspective view of a hatch to access the means to supply lubricant to a tank.
Figure 12:
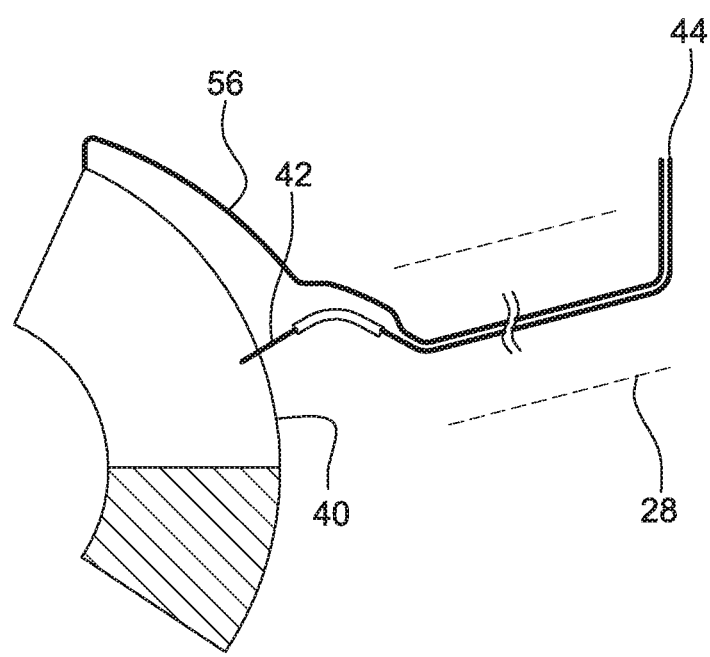
FIG. 12 is another larger scale schematic view similar to that of FIG. 6 and providing a detailed view of the supply means.

In the example represented in FIGS. 10 and 11, the venting cap cannot be positioned directly on the tank 40 due to accessibility problems to the latter. It would be easily conceivable to deport the venting cap to the nacelle compartment, by providing a second tube passing in the same arm and connecting to the uppermost point of the tank. Parallel routing of two tubes in a same arm does not appear to be more critical because of the very small diameter of the pipe 56 required to evacuate the air. This small pipe 56 could even be moved to the line 42 (as in a fuel pump nozzle for example—see FIG. 12).

Figure 13:
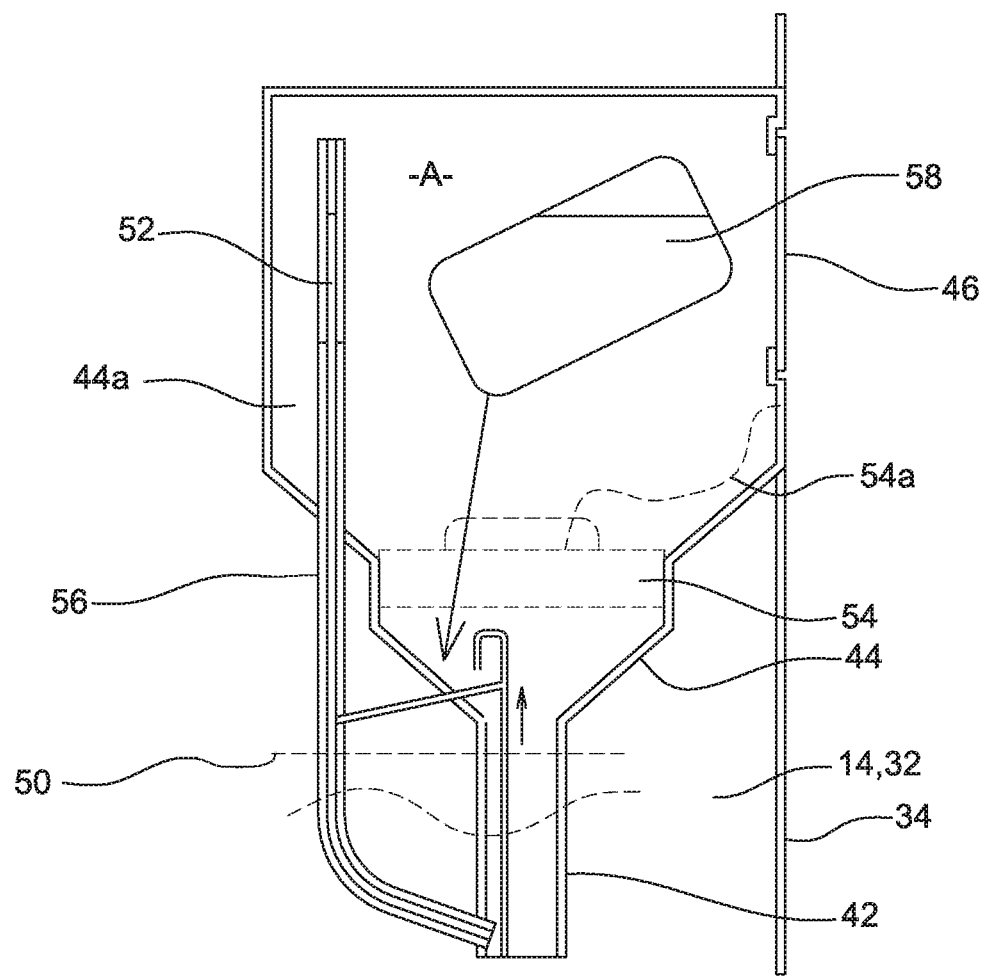
FIG. 13 is another schematic view of a hatch to access the means to supply lubricant to a tank.

FIG. 13 is an example of embodiment incorporating several of the aspects described above, including especially the float 52, the vent pipe 56, the cap 54 and the means to secure the filling interface of the tank to the nacelle 14. The hatch 46 is opened by the operator so that the can 58 can be introduced into the chamber A and oil can be poured from the can 58 through the opening 44 and the funnel 44a, the operator having a good visibility during the operation through the opening in the cowl of the nacelle which is closable with the hatch 46.

The advantages of this solution compared to competing architectures are multiple:
  filling through an arm enables to fill the tank by gravity. It is therefore not necessary to provide specific filling tools associated with this new architecture. The filling can therefore be carried out in any airport without the need for additional equipment;
  compared to a remote filling close to the exhaust cone of the turbine engine along the gas generator (existing in competing engine), this solution prevents any coking of the oil on the walls of the supply line. Indeed, the arms being in the bypass flow, the air temperature in this area is very close to the ambient one;
  the weight of the system is reduced as the route taken to fill the tank is as direct as possible;
  filling through an access hatch 46 on the nacelle allows the implementation of a system to visualize the oil level and avoids blind filling by an operator.

While illustrative embodiments have been illustrated and described, it will be appreciated that various changes can be made therein without departing from the spirit and scope of the invention.

The embodiments of the invention in which an exclusive property or privilege is claimed are defined as follows:

1. A bypass turbine engine comprising:
  a gas generator surrounded by a nacelle and connected to the nacelle by a plurality of tubular arms,
  a primary flow duct within the gas generator being externally delimited by a first annular casing of the gas generator,
  a bypass flow duct of a secondary flow around the gas generator being internally delimited by a second annular casing of the gas generator and externally by a third annular casing of the nacelle,
  the second and third casings being connected together by at least some of the plurality of tubular arms,
  at least one lubricant tank located in an annular space extending between the first and second casings, and
  lubricant supply means of the at least one lubricant tank that comprise at least one supply line extending from the at least one lubricant tank to at least one filler opening located in a vicinity of the third casing, passing within at least one of the at least some of the plurality of tubular arms connecting the gas generator and the nacelle, wherein
    the supply means comprises means to visualize a lubricant level in the at least one lubricant tank and a vent pipe of the at least one lubricant tank, extending from the at least one lubricant tank up to a vicinity of the filler opening, passing inside the at least one of the at least some of the plurality of tubular arms connecting the second and third casings.

2. The turbine engine of claim 1 wherein the tank has a generally curved shape and extends partially about a longitudinal axis of the turbine engine.

3. The turbine engine of claim 1 wherein the at least one tank is located substantially perpendicular to a low pressure compressor of the gas generator.

4. The turbine engine of claim 1 wherein the nacelle comprises an outer annular cowling comprising at least one hatch providing access to the at least one filler opening.

5. The turbine engine of claim 1 wherein the supply means are configured so that lubricant that is poured in the at least one filler opening flows by gravity only to the at least one lubricant tank.

6. The turbine engine of claim 1 wherein the visualization means comprise at least one float.

7. The turbine engine of claim 1 wherein the at least one supply line comprises a first substantially straight section that extends substantially radially, with respect to a longitudinal axis of the turbine engine, inside the at least one of the at least some of the plurality of tubular arms, and a second substantially straight section that extends substantially parallel to the longitudinal axis, in the downstream direction, inside said space.

8. The turbine engine of claim 1 wherein said at least one filler opening is located upstream from a cascade thrust reverser of the turbine engine.

9. The turbine engine of claim 1 wherein said at least one filler opening is located in a filling chamber of which at least some of walls are secured to an outer annular cowling of the nacelle.

* * * * *